United States Patent [19]

Peterson et al.

[11] Patent Number: 4,688,158
[45] Date of Patent: Aug. 18, 1987

[54] FLYBACK POWER SUPPLY

[75] Inventors: Gregory A. Peterson, Morris; Michael A. Loda, Hanover Park; Timothy E. Graff, Palatine, all of Ill.

[73] Assignee: Motorola, Inc., Schaumburg, Ill.

[21] Appl. No.: 933,661

[22] Filed: Nov. 21, 1986

Related U.S. Application Data

[63] Continuation of Ser. No. 799,677, Nov. 19, 1985, abandoned.

[51] Int. Cl.$^4$ .......................................... H02M 3/335
[52] U.S. Cl. ...................................... 363/21; 363/80; 363/97
[58] Field of Search .................... 363/20–21, 363/56, 79–80, 97, 131

[56] References Cited

U.S. PATENT DOCUMENTS

| | | | |
|---|---|---|---|
| 4,244,015 | 1/1981 | Beebe | 363/97 X |
| 4,301,497 | 11/1981 | Johari | 363/21 |
| 4,326,244 | 4/1982 | Josephson | 363/21 X |
| 4,454,573 | 6/1984 | Petsch et al. | 363/98 |
| 4,458,112 | 7/1984 | Svala | 379/405 |
| 4,489,369 | 12/1984 | Ginsberg | 363/21 |

Primary Examiner—Peter S. Wong
Attorney, Agent, or Firm—Phillip H. Melamed

[57] ABSTRACT

A flyback power supply is disclosed which includes a sample and hold feedback path. A pulse width modulation circuit provides control signals for a drive device that determines current excitation pulses for a primary winding of a transformer. A secondary winding of the transformer is connected to a rectifier circuit and provides a DC voltage signal at an output terminal. A selective feedback path is provided between the output terminal and a sense input terminal of the pulse width modulation circuit. The selective feedback path comprises a sample and hold circuit which provides for effectively coupling the output terminal to the sense input terminal at times during the storage of energy in the transformer, corresponding to an increase in transformer flux, and wherein at other times when the transformer flux is decreasing and energy is being transferred from the transformer to the rectifier circuit the feedback path effectively disconnects the output terminal from the sense input. The sample and hold circuit comprises a series pass transistor and a holding capacitor. The series pass transistor is selectively turned on and off in accordance with the control output signal of the pulse width modulation circuit that determines the primary winding current pulses.

12 Claims, 1 Drawing Figure

FLYBACK POWER SUPPLY

This is a continuation of application Ser. No. 799,677, filed Nov. 19, 1985, now abandoned.

BACKGROUND OF THE INVENTION

The present invention is related to the field of flyback power supplies. More particularly, the present invention is related to stable flyback power supplies which include an output sensing feedback control loop and wherein the power supply remains stable even when operated in a continuous excitation mode with respect to current excitation of the primary winding of a flyback transformer in the power supply.

In known flyback power supplies, pulsed current excitation is supplied to the primary winding of a flyback transformer and a secondary winding of the transformer is coupled, typically through a rectifier, to a load. The rectified output is sensed and provided by a feedback path as an input to a drive circuit which provides drive signals that determine the primary winding current excitation pulses. The drive signals vary in accordance with the sensed output so as to maintain the output at a desired level, thus regulating the output.

Typically these flyback power supplies are operated in a discontinuous mode for stability reasons. In a discontinuous mode, magnetic flux will increase in the transformer during primary winding current pulses, and between primary winding current pulses the flux decreases to a substantially zero value. Typically the decrease of flux to zero is abrupt, the flyback transformers operated in the discontinuous mode typically generate substantial radio frequency interference (RFI). In addition, typically large primary winding current pulses must be utilized in order to store a substantial amount of energy for subsequent transfer to the secondary winding, or else the frequency of the primary excitation pulses must be increased.

If the flyback power supply is operated in a continuous mode such that the transformer flux has a substantial non-zero magnitude prior to the drive circuit causing an increase in flux to store additional energy, less primary current can be utilized and less RF interference is generated. Also a lower excitation frequency can be used if desired. However, operating in a continuous mode typically results in stability problems for the power supply, thus preventing the utilization of a continuous mode flyback power supply or requiring tight controls on the system gain, the input signal magnitude and the frequency of primary current excitation in order to maintain limited stability. However, due to load variation, typically this stability cannot be maintained. Therefore, substantially all flyback power supplies are operated in the discontinuous mode.

SUMMARY OF THE INVENTION

An object of the present invention is to provide an improved flyback power supply which overcomes the above-mentioned deficiencies of prior flyback power supplies.

A more specific of the present invention is to provide a stable flyback power supply which can be operated in a continuous mode.

In one embodiment of the present invention a flyback power supply is provided. The flyback power supply comprises: terminal means for receiving a DC power supply voltage input signal having a magnitude which may vary over a range of magnitudes; transformer means having a primary winding coupled to said terminal means and a secondary winding; drive circuit means having at least a sense signal input and providing, as an output, a control input signal to a control electrode of a drive device coupled to said primary winding for controlling primary current therein provided by said power supply voltage input signal; rectifier means coupled to said secondary winding for rectifying signals induced in said secondary winding and providing, at an output terminal, a DC power supply output voltage in response thereto; feedback path means connected between said output terminal and said sense input for controlling said drive circuit means to maintain said power supply output signal at a desired level; wherein the improvement comprises; said feedback path means comprising a sample and hold circuit comprising a controllable gate device provided between said output terminal and a holding capacitor connected to said sense input, a control terminal of said gate device receiving switching signals, wherein said gate device is alternately opened and closed such that said power supply output signal is effectively sampled by said holding capacitor when said control device causes primary winding current flow causing a flux increase in said transformer means so as to store energy therein, and wherein said holding capacitor is effectively disconnected from said output terminal at all other times when flux in said transformer means decreases and said stored energy is provided to said secondary winding and to said rctifier means, whereby stability of said power supply is provided by discontinuous feedback path sampling at times other than the times at which energy is transferred from said primary to secondary windings.

More particularly, in the preferred embodiment of the present invention, the drive device will implement a continuous mode of excitation for the flyback transformer such that the transformer flux has a substantial non-zero magnitude prior to the drive device initiating primary winding current flow causing the flux to increase. The preferred embodiment of the present invention utilizes a pulse width modulation circuit as the drive circuit means and provides for alternately opening and closing the gate device in accordance with an output of the pulse width modulation circuit that is provided as the control input signal to the drive device that determines the primary winding excitation. This insures the proper synchronization of the controllable gate device with respect to primary winding excitation. In addition, preferably the gate device comprises a series pass device connected between the output terminal and the pulse width modulation sense input. Preferably the drive device comprises an FET transistor.

By providing a discontinuous feedback path in accordance with the teachings of the present invention, a flyback power supply has been provided which is unconditionally stable regardless of variations in power supply load and regardless of variations in the magnitude of the DC power supply voltage input signal. This means less expensive, looser tolerance circuit components can be used. When the power supply is operated in a continuous mode, this results in less radio frequency interference being generated by the flyback power supply and can result in utilization of lower magnitude primary winding current excitation pulses. In addition, the present invention provides greater design flexibility with regard to determining the frequency of operation of the pulse width modulation circuit such that either high or low frequencies can be selected for the period of the signal that determines the primary winding current excitation pulses. If a high frequency of operation is selected, which is now possible since less RF interference is produced, less expensive, smaller size circuit components can be utilized for the power supply.

These and other advantages of the present invention are best understood by reference to the more detailed description of the present invention which follows.

BRIEF DESCRIPTION OF THE DRAWING

For a more complete understanding of the present invention, reference should be made to the drawing in which.

DESCRIPTION OF THE PREFERRED EMBODIMENTS OF THE INVENTION

Figure 1:
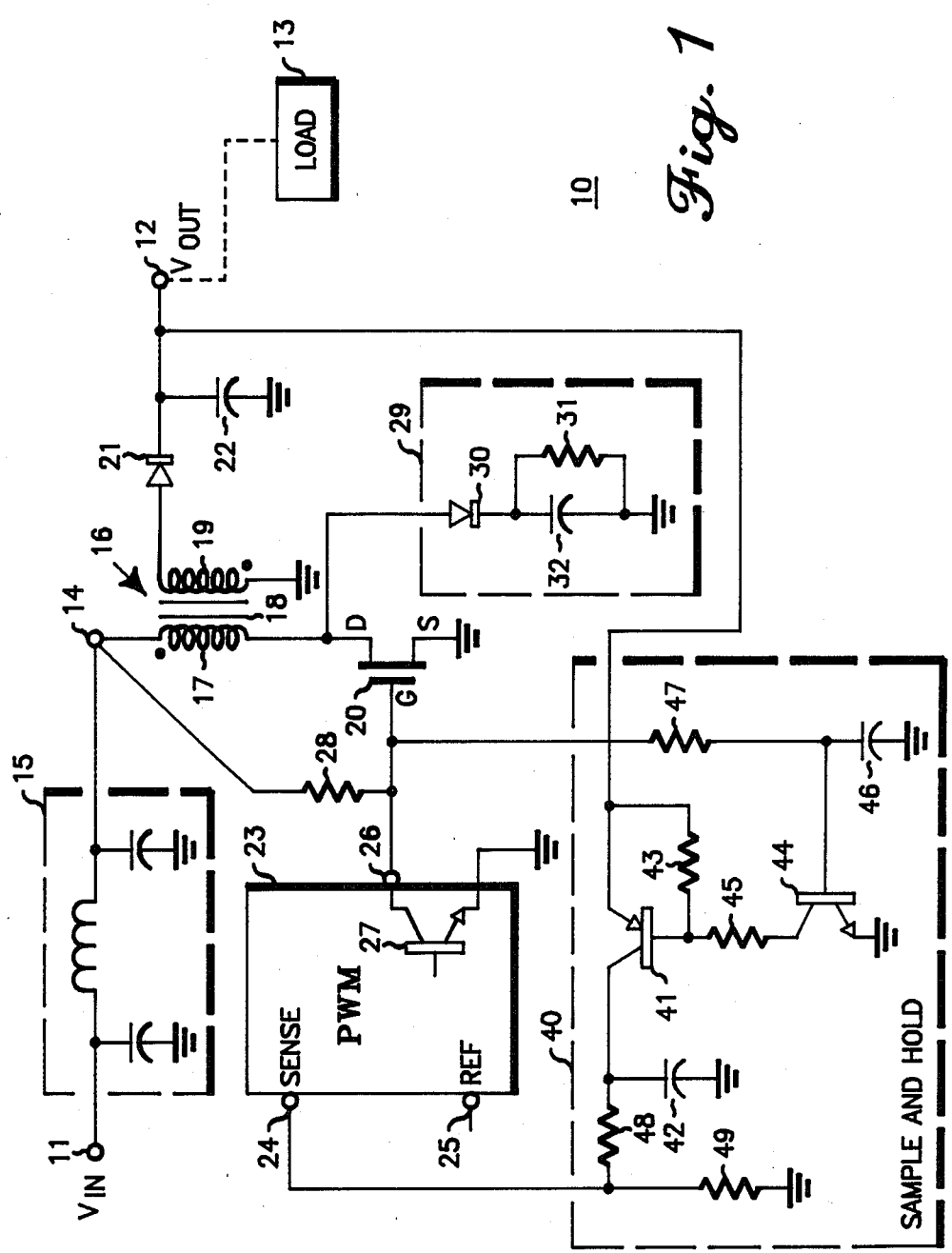
FIG. 1 comprises a schematic diagram of a flyback power supply constructed in accordance with the teachings of the present invention.

Referring to the drawing, a flyback power supply 10 is illustrated. The power supply includes an input terminal 11 at which a DC power supply voltage input signal $V_{in}$ is received wherein the magnitude of this signal may vary over a wide range of magnitudes. In essence, the flyback power supply receives a DC input signal $V_{in}$ and provides, in response thereto, a well regulated DC output signal $V_{out}$ at an output terminal 12. It is contemplated that various loads, shown schematically in the FIGURE as load 13, may be connected to the output terminal 12. Thus the flyback power supply performs a regulating and power transfer function so as to generate the desired regulated signal $V_{out}$.

The input terminal 11 is connected to a terminal 14 through a filter network 15 shown dashed in the FIGURE. The filter network performs an initial voltage smoothing function for the signal $V_{in}$ so as to provide a DC signal at the terminal 14 with somewhat less ripple. The flyback power supply 10 includes a transformer 16 having a primary winding 17 having one end directly connected to the terminal 14 and another end directly connected to the drain terminal of an FET transistor 20. The transformer 16 includes a transformer core 18, in which transformer flux is created by excitation of the primary winding 17, and a secondary winding 19 coupled to the transformer core and primary winding. One end of the secondary winding 19 is connected to ground, and another end is connected through a rectifying diode 21 to the output terminal 12 while a capacitor 22 is connected between the terminal 12 and ground. Essentially, the diode 21 and capacitor 22 form a rectifying means coupled to the secondary winding 19 for rectifying signals induced in the secondary winding and providing a DC power supply output voltage in response thereto at the output terminal 12.

The FET transistor 20 essentially controls the current excitation of the primary winding 17 by being periodically driven on and off. A source terminal of the FET transistor is directly connected to ground and a gate or control electrode terminal of the FET transistor receives periodic variable duty cycle pulses from a pulse width modulation (PWM) circuit 23 shown in the FIGURE. The pulse width modulation circuit 23 has a sense input terminal 24 for receiving signals generally related to the magnitude of the output signal $V_{out}$. The PWM circuit 23 also includes a reference terminal 25 at which an external predetermined reference voltage may be provided. Alternatively, the circuit 23 may internally generate the reference voltage at terminal 25. In response to the difference between the output related sense voltage at the terminal 24 and the reference voltage at the terminal 25, the pulse width modulation circuit 23 provides, as an output at a terminal 26, a control input signal which is applied to the gate of the FET transistor 20. The FET 20 serves as a drive device for the primary winding 17 of the transformer 16. In this manner, the output of the pulse width modulation circuit, via the drive device 20, controls the primary winding current which is provided by the voltage at the terminal 14 that is determined in accordance with the voltage input signal $V_{in}$.

It should be noted that preferably the pulse width modulation circuit 23 shown in the FIGURE can comprise a Motorola integrated circuit MC34060 which is responsive to DC sense signals so as to provide a variable duty cycle pulse width modulated output signal in accordance with the difference between the sensed signal magnitude and a reference voltage maintained at the terminal 25. The final output device of the pulse width modulation circuit 23 is shown in the FIGURE as an NPN transistor 27 having its collector connected to the terminal 26. Due to this configuration, a biasing-/load resistor 28 is coupled between the terminal 26 and the terminal 14. In addition, the flyback power supply 10 shown in the FIGURE includes a conventional "snubber" circuit 29 shown dashed as comprising a diode 30, a resistor 31 and a capacitor 32 connected between the drain terminal of the FET 20 and ground. The function of the snubber circuit is essentially to protect the FET device from high reverse bias voltages which may be generated by abruptly interrupting the current flow in the primary winding 17 when the FET transistor is turned off. The snubber circuit 29 essentially functions to limit the magnitude of the reverse bias voltages produced at the drain terminal of the FET. The operation of the snubber circuit is not particularly significant with respect to the present invention.

It should be noted that an FET transistor is utilized to control the switching of the primary winding current since such transistors have good high frequency and temperature characteristics thus enabling operation of the flyback power supply over wide temperature ranges and enabling the selection of a relatively high frequency, if desired, for the periodic switching on and off of the FET transistor which results in the generation of periodic current pulses for the primary winding 17.

A feedback path is provided betwen the output terminal 12 and the sense input terminal 24 of the pulse width modulation circuit 23. The function of this feedback path is to provide, at the sense terminal 24, a signal related to the magnitude of the output voltage $V_{out}$. Typically this feedback path can comprise either a direct connection or a transformer coupled connection between the output terminal 12 and the sense terminal 24. However, the provision in prior flyback transformers of this feedback path generally resulted in stability problems for the flyback power supply, particularly if the power supply was operated in a continuous mode wherein the transformer flux had a substantially non-zero magnitude at and immediately prior to the turning on of the drive device that then resulted in causing primary winding current so as to increase the transformer flux. In such situations, substantial stability problems existed which typically resulted in all prior flyback transformers being operated in the discontinuous mode despite the fact that in such a mode high primary current pulses were required and substantial RF interference was generated. These disadvantages have been overcome by the present invention.

In the flyback power supply 10, a selective discontinuous feedback path 40 is provided between the output terminal 12 and the input sense terminal 24. This feedback path 40 is shown dashed in the FIGURE and comprises a PNP series pass transistor 41 having its emitter terminal directed connected to the output terminal 12 and its collector terminal directly connected to one electrode of a holding capacitor 42 having its other electrode connected to ground. The transistor 41 forms a controllable gate device. The base of the transistor 41 is connected to the terminal 12 through a biasing resistor 43. An NPN control transistor 44 is provided in the feedback path 40 and has its emitter connected to ground, its collector connected to the base of the transistor 41 through a resistor 45 and its base connected to ground through a capacitor 46 and connected to the terminal 26 through a resistor 47. The collector of the transistor 41 is directly connected to the sensed terminal 24 through a series resistor 48 wherein a resistor 49 connected between the terminal 24 and ground and performs a voltage divider function in combination with the resistor 48. Essentially the components 41 through 49 comprise the selective feedback path 40 of the present invention. The path 40 comprises a DC circuit path between the series pass device 41 and terminals 12 and 24.

Essentially, the selective feedback path 40 implements a sample and hold function by virtue of the selective conduction of the series pass device 41 and the holding capacitor 42 such that an effective direct connection between the terminal 12 and the sense terminal 24 is only provided at certain times. In the present invention, these times occur during the existence of primary winding current pulses which cause an increase in the transformer flux so as to store energy in the transformer. This occurs by virtue of the periodic pulse width modulation control input signal provided at the terminal 26 functioning as a switching signal. This switching signal causes the FET transistor 20 to turn on and, at the same time, turns on the transistor 44 which results in turning on the transistor 41. Thus during primary winding current pulses causing an increase in transformer flux, the series pass transistor 41 couples the voltage at the terminal 12 to the holding capacitor 42. This effectively samples the signal $V_{out}$. When the pulse width modulation control signal at the terminal 26 turns off the FET drive device 20, current effectively ceases in the primary winding 17 and flux in the transformer 16 will decrease resulting in the transfer of the stored energy in the transformer to the secondary winding 19 and to the rectifier circuit comprising the components 21 and 22. At this time, the transistors 44 and 41 are turned off, thus preventing any transient signals at the terminal 12 from reaching the holding capacitor 42 and the sense input terminal 24. Because of this, the stability of the flyback power supply 10 is maintained since instability typically results from providing a continuous feedback path between the output and sense terminals during the time that energy is transferred from the transformer to the rectifier circuit.

Because of the configuration of the present invention, the flyback power supply 10 is unconditionally stable, thus allowing the power supply to be operated in a continuous mode, whereas previously operating a flyback power supply in a continuous mode would not be possible since the power supply would not remain stable and would produce undesired signal oscillations. In the continuous mode of operation, the period of the control signal provided at the terminal 26 by the pulse width modulator circuit 23 is such that the transformer flux, while decreasing during the off time of the FET transistor 20, never reaches a substantially zero magnitude prior to the occurrence of the next primary winding current pulse. Thus preferably the flyback transformer 10 is operated in a continuous mode such that flux in the transformer will have a substantial non-zero magnitude at and immediately prior to the time the FET transistor initiates primary winding current flow pulses which cause the transformer flux to increase. Because of this, the effective inductance of the primary winding 17 is increased such that a larger amount of energy is storable in the transformer 16 while a smaller amount of current can be utilized to provide this larger amount of stored energy. In addition, operation in the continuous mode reduces RF interference which may be produced by the switching on and off of the primary current.

It should be noted that while the present invention is described in terms of a flyback power supply designed to operate in a continuous mode, the present invention is also applicable to flyback power supplies that are designed to operate in a discontinuous mode, but may occasionally be inadvertently operated in a continuous mode due to variations in the load 13. Thus the present invention provides for unconditional stability of flyback power supply 10 regardless of what type of mode it is designed to be operated in. This stability is achieved despite any variations in the load 13. In addition, this stability is also maintained despite wide variations in the magnitude of the input signal $V_{in}$.

While specific embodiments of the present invention have been shown and described, further modifications and improvements will occur to those skilled in the art. All such modifications which retain the basic underlying principles disclosed and claimed herein are within the scope of this invention.

We claim:

1. A flyback power supply comprising:
   terminal means for receiving a DC power supply voltage input signal having a magnitude which may vary over a range of magnitudes;
   transformer means having a primary winding coupled to said terminal means and a secondary winding;
   drive circuit means having at least a sense signal input and providing, as an output, a control input signal to a control electrode of a drive device coupled to said primary winding for controlling primary current therein provided by said power supply voltage input signal;
   rectifier means coupled to said secondary winding for rectifying signals inducted in said secondary winding and providing, at an output terminal, a DC power supply output voltage in response thereto;
   feedback path means connected between said output terminal and said sense input for controlling said drive circuit means to maintain said power supply output signal at a desired level;
   wherein the improvement comprises;
   said feedback path means comprising a sample and hold circuit comprising a controllable gate device provided between said output terminal and a holding device connected to said sense input, a control terminal of said gate device receiving a switching signal, wherein said gate device is alternately opened and closed such that said power supply output signal is effectively sampled by said holding device when said control device causes primary winding current flow causing a flux increase in said transformer means so as to store energy therein, and wherein said holding device is effectively disconnected from said output terminal at all other times when flux in said transformer means decreases and said stored energy is provided to said secondary winding and to said rectifier means, whereby stability of said power supply is provided by discontinuous feedback path sampling at times other than the times at which energy is transferred from said primary to secondary windings.

2. A flyback power supply according to claim 1 wherein said drive device implements a continuous mode of excitation for said transformer such that flux in said transformer means has a substantial non-zero magnitude at the time the drive device initiates primary winding current flow causing said flux increase.

3. A flyback power supply according to claim 1 wherein said gate device comprises a controllable series pass devices connected between said output terminal and said drive circuit means sense input.

4. A flyback power supply according to claim 3 wherein said feedback path means comprises a DC circuit path between said series pass device and said output terminal and a DC circuit path between said series pass device and said drive circuit means sense input.

5. A flyback power supply according to claim 1 wherein said drive device comprises a FET transistor.

6. A flyback power supply according to claim 1 wherein said gate device comprises a transistor and wherein said control terminal comprises a base electrode of said transistor.

7. A flyback power supply comprising:
terminal means for receiving a DC power supply voltage input signal having a magnitude which may vary over a range of magnitudes;
transformer means having a primary winding coupled to said terminal means and a secondary winding;
drive circuit means comprising a pulse width modulation (PWM) circuit having at least a sense signal input and providing, as an output, a control input signal to a control electrode of a drive device coupled to said primary winding for periodically controlling primary current therein provided by said power supply voltage input signal;
rectifier means coupled to said secondary winding for rectifying signals induced in said secondary winding and providing, at an output terminal, a DC power supply output voltage in response thereto;
feedback path means connected between said output terminal and said PWM input for controlling said PWM circuit to maintain said power supply output signal at a desired level;
wherein the improvement comprises;
said feedback path means comprising a sample and hold circuit comprising a controllable gate device provided between said output terminal and a holding device connected to said PWM sense input, a control terminal of said gate device receiving switching signals determined in accordance with said PWM output, wherein said gate device is alternately opened and closed in accordance with said PWM output such that said power supply output signal is effectively sampled by said holding device when said control device causes primary winding current flow causing a flux increase in said transformer means so as to store energy therein, and wherein said holding device is effectively disconnected from said output terminal at all other times when flux in said transformer means decreases and said stored energy is provided to said secondary winding and to said rectifier means, whereby stability of said power supply is provided by discontinuous feedback path sampling at times other than the times at which energy is transferred from said primary to secondary windings.

8. A flyback power supply according to claim 7 wherein said drive device implements a continuous mode of excitation for said transformer such that flux in said transformer means has a substantially non-zero magnitude at the times the drive device periodically initiates primary winding current flow causing said flux increase.

9. A flyback power supply according to claim 7 wherein said gate device comprises a controllable series pass devices connected between said output terminal and said drive circuit means sense input.

10. A flyback power supply according to claim 9 wherein said feedback path means comprises a DC circuit path between said series pass device and said output terminal and a DC circuit path between said series pass device and said drive circuit means sense input.

11. A flyback power supply according to claim 7 wherein said drive device comprises a FET transistor.

12. A flyback power supply according to claim 7 wherein said gate device comprises a transistor and wherein said control terminal comprises a base electrode of said transistor.

* * * * *